US006941060B1

(12) United States Patent
Nagaishi et al.

(10) Patent No.: US 6,941,060 B1
(45) Date of Patent: Sep. 6, 2005

(54) IMAGE/VOICE DATA CONVERSION DEVICE AND DISK UNIT USING IT

(75) Inventors: Yuji Nagaishi, Daito (JP); Toshiharu Koshino, Kadoma (JP); Toshiki Yamamura, Suita (JP); Tsukasa Yoshiura, Hirakata (JP); Shinichiro Takigawa, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/647,437

(22) PCT Filed: Feb. 24, 2000

(86) PCT No.: PCT/JP00/01078

§ 371 (c)(1),
(2), (4) Date: Sep. 28, 2000

(87) PCT Pub. No.: WO00/51130

PCT Pub. Date: Aug. 31, 2000

(30) Foreign Application Priority Data

Feb. 26, 1999 (JP) .................................. 11-051739

(51) Int. Cl.[7] .............................................. H04N 5/93
(52) U.S. Cl. ...................................... 386/52; 386/125
(58) Field of Search .................... 386/52, 55, 125–126; 348/722; H04N 5/93

(56) References Cited

U.S. PATENT DOCUMENTS

| 5,508,940 A | * | 4/1996 | Rossmere et al. .......... 345/723 |
| 5,636,073 A |   | 6/1997 | Yamamoto et al. |
| 5,828,841 A |   | 10/1998 | Ito et al. |
| 5,835,662 A |   | 11/1998 | Inoue et al. |
| 5,838,874 A | * | 11/1998 | Ng et al. ........................ 386/96 |
| 6,038,368 A | * | 3/2000 | Boetje et al. ................. 386/52 |
| 6,229,576 B1 | * | 5/2001 | Tarr et al. .................... 348/575 |

FOREIGN PATENT DOCUMENTS

| JP | 4-19874 A | 1/1992 |
| JP | 5-216487 | 8/1993 |
| JP | 6-350649 A | 12/1994 |
| JP | 7-114788 | 5/1995 |
| JP | 7-327032 A | 12/1995 |
| JP | 09182008 A | 7/1997 |
| JP | 10155114 A | 6/1998 |
| JP | 10199214 A | 7/1998 |
| JP | 10-304302 | 11/1998 |
| JP | 10313439 A | 11/1998 |
| JP | 10 319899 | 12/1998 |
| JP | 11-8830 | 1/1999 |
| JP | 11-144378 | 5/1999 |
| WO | WO99/12165 | 3/1999 |

* cited by examiner

*Primary Examiner*—Vincent Boccio
(74) *Attorney, Agent, or Firm*—Akin Gump Strauss Hauer & Feld, LLP

(57) ABSTRACT

A video and audio data converter capable of insert-edit-processing another video data and audio data in real time while reproducing produced video and audio data and a disk apparatus using the video and audio data converter are configured so that a plurality of video and audio data input and output from a plurality of external apparatuses to video and audio input/output sections are input and output while the video and audio data input and output to one video and audio input/output section is replaced with the video and audio data input and output to another video and audio input/output section in a video and audio data conversion section.

5 Claims, 13 Drawing Sheets

FIG. 4  Configuration of one DIF sequence

IMAGE/VOICE DATA CONVERSION DEVICE AND DISK UNIT USING IT

TECHNICAL FIELD

The present invention relates to a video and audio data converter for converting a plurality of video and audio data so as to meet the interface of a storage apparatus such as a disk apparatus, and recording and reproducing the video and audio data onto and from the disk apparatus, and a disk apparatus using the video and audio data converter.

BACKGROUND ART

In recent years, disk apparatuses such as magnetic disk apparatuses and optical disk apparatuses have rapidly been improving in performance associated with the storage capacity and the transfer rate, and have come to be frequently used as storage devices for video and audio data which is moving image data.

To record video and audio data produced by an external apparatus onto disk apparatuses on which expectations have been placed as such video and audio data storage devices, it is necessary to convert the transfer procedure of video and audio data so as to meet the interfaces of the disk apparatuses. Recently, such converters of the video and audio data, and disk apparatuses having such converters have come along.

Because of having random access performance, disk apparatuses having such converters have a characteristic that the target video and audio data can be immediately accessed by recording the video and audio data onto the disk apparatuses.

The conventional disk apparatuses as described above have the functions of inputting video and audio data from a plurality of external apparatuses and storing the video and audio data onto a disk which is a storage medium. However, among the conventional disk apparatuses, no disk apparatuses have heretofore been present that has an insert-edit function such as replacing only the audio data of recorded video and audio data or writing desired data while reproducing recorded video and audio data. The insert-edit function includes a video insert function in which only video is replaced, an audio insert function in which only audio is replaced, an AV insert function in which both video and audio are replaced at the same time, and a post-recording function in which only audio is additionally recorded.

It is impossible for the conventional disk apparatuses to select only necessary data and record the selected data into another video and audio data, such as to extract only video data from input video and audio data and record the extracted video data or to extract only audio data and record the extracted audio data.

An object of the present invention is to provide a video and audio data converter having an insert-edit function and the like which the conventional disk apparatuses do not have, and a disk apparatus using the video and audio data converter, and an object of the present invention is to provide a video and audio data converter converting video and audio data from a video and audio apparatus which is an external apparatus so as to meet the interface of a disk apparatus, having an input and output interface for video and audio data from a plurality of external apparatuses, and being capable of insert-edit-processing video data, audio data and video and audio data as required and inputting and outputting the processed data, and a disk apparatus using the video and audio data converter.

Moreover, an object of the present invention is to provide a video and audio data converter capable of insert-edit-processing another video and audio data in real time while reproducing produced video and audio data, and a disk apparatus using the video and audio data converter.

DISCLOSURE OF INVENTION

To achieve the above-mentioned objects, a video and audio data converter according to the present invention comprises: a first video and audio input/output section inputting and outputting first video and audio data;
  a second video and audio input/output section inputting and outputting second video and audio data;
  a video and audio data conversion section replacing at least a part of the video and audio data input and output to the first video and audio input/output section with at least a part of the video and audio data input and output to the second video and audio input/output section, and inputting and outputting the data;
  a data storage section temporarily storing data input and output to the video and audio data conversion section; and
  an interface control section controlling an interface in order to input and output data between the data storage section and external storage means.

The video and audio data converter of the present invention configured as described above has an insert-edit function which is not conventionally provided such as the video insert function in which only video is replaced, the audio insert function in which only audio is replaced, the AV insert function in which both video and audio are replaced at the same time, and the post-recording function in which only audio is additionally recorded.

A video and audio data converter of the present invention according to another aspect comprises: a first video and audio input/output section inputting and outputting first video and audio data;
  a second video and audio input/output section inputting and outputting second video and audio data;
  a first input/output data control section controlling data input and output to the first video and audio input/output section;
  a second input/output data control section controlling data input and output to the second video and audio input/output section;
  a timing generation section generating a timing signal for controlling data input and output of the first input/output data control section and the second input/output data control section;
  a buffer memory temporarily storing data input and output to the first input/output data control section and the second input/output data control section and data input and output to external storage means;
  a buffer memory control section controlling the buffer memory; and
  an interface control section performing interface control for inputting and outputting, to the external storage means, data input and output to the buffer memory.

The video and audio data converter of the present invention configured as described above converts video and audio data from a video and audio apparatus which is an external apparatus so as to be supported by the interface of a disk apparatus, has an input and output interface for video and audio data from a plurality of external apparatuses, and is capable of insert-edit-processing video data, audio data and video and audio data as required and inputting and outputting the processed data.

A disk apparatus according to the present invention comprises: a disk medium storing video and audio data;
- a first video and audio input/output section inputting and outputting first video and audio data;
- a second video and audio input/output section inputting and outputting second video and audio data;
- a video and audio data conversion section replacing at least a part of the video and audio data input and output to the first video and audio input/output section with at least a part of the video and audio data input and output to the second video and audio input/output section, and inputting and outputting the data;
- a buffer memory temporarily storing data input and output to the video and audio data conversion section;
- a buffer memory control section controlling the buffer memory; and
- a recording and reproduction section recording and reproducing data input and output to the buffer memory onto the disk medium.

The disk apparatus of the present invention configured as described above has an insert-edit function which conventional disk apparatuses do not have such as the video insert function in which only video is replaced, the audio insert function in which only audio is replaced, the AV insert function in which both video and audio are replaced at the same time, and the post-recording function in which only audio is additionally recorded.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

BEST MODE FOR CARRYING OUT THE INVENTION

Hereinafter, preferred embodiments of the video and audio data converter according to the present invention will be described with reference to the accompanying drawings.

First Embodiment

Figure 1:
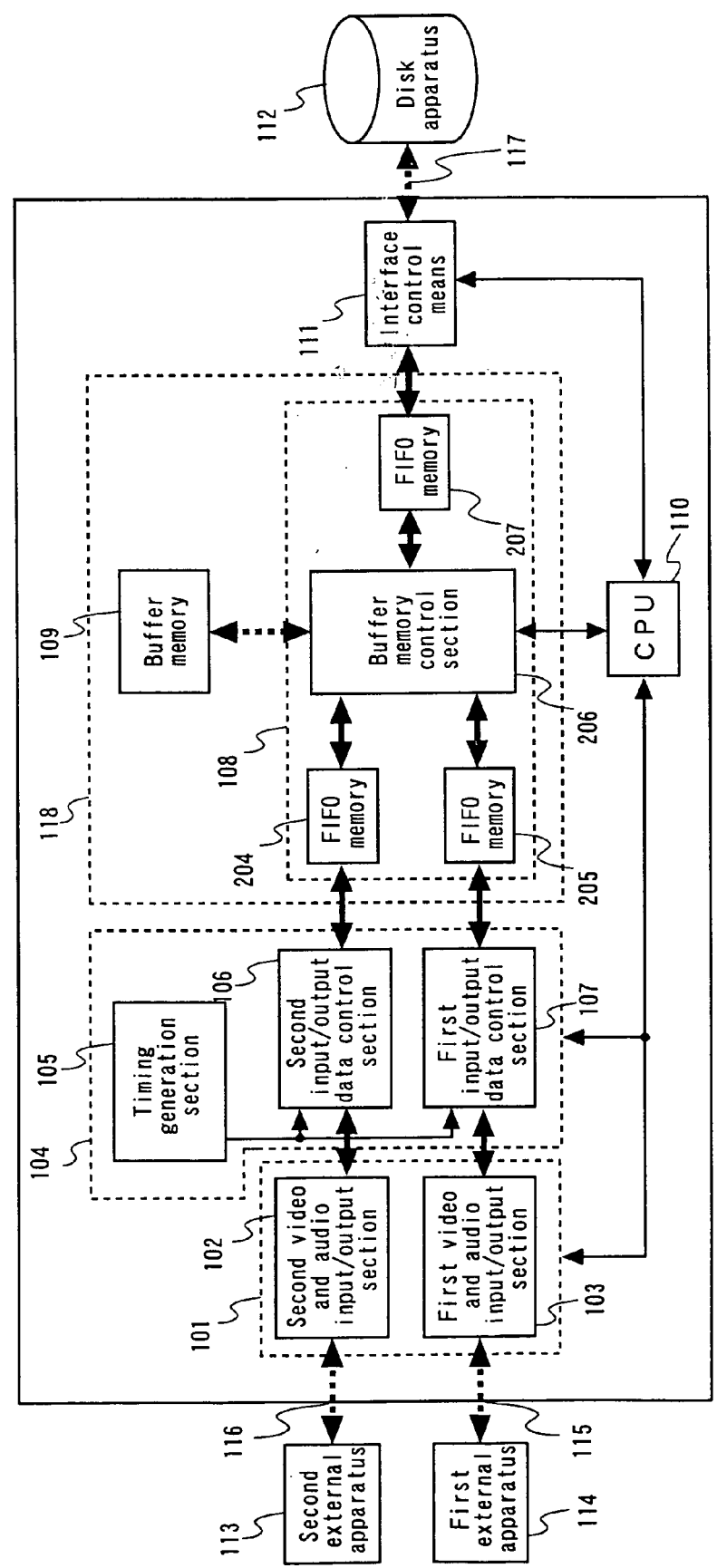
FIG. 1 is a block diagram showing the configuration of a video and audio data converter of a first embodiment according to the present invention.

FIG. 1 is a block diagram showing the configuration of a video and audio data converter of a first embodiment according to the present invention.

The video and audio data converter of the first embodiment shown in FIG. 1 is connected between a plurality of external apparatuses inputting and outputting video and audio data, and a disk apparatus having a disk which is a storage medium.

A first external apparatus 114 is connected to a first video and audio input/output section 103 through a data bus 115. A second external apparatus 113 is connected to a second video and audio input/output section 102 through a data bus 116. A video and audio input/output section 101 constituted by the first video and audio input/output section 103 and the second video and audio input/output section 102 has an interface function for inputting and outputting digital video and audio data or analog video and audio data.

The video and audio input/output section 101 is connected to a video and audio data conversion section 104, and the data input and output between the video and audio input/output section 101 and the video and audio data conversion section 104 is controlled by the video and audio data conversion section 104. Moreover, the video and audio data conversion section 104 is connected to a data storage section 118, and the data from the video and audio data conversion section 104 is input and output to a buffer memory 109 of the data storage section 118. The input and output of the data to the buffer memory 109 is controlled by a buffer control section 108. As shown in FIG. 1, the buffer control section 108 is constituted by a FIFO memory 204, a FIFO memory 205, a buffer memory control section 206 and a FIFO memory 207. The buffer control section 108 controls access of the video and audio data conversion section 104, a CPU 110 and an interface control section 111 to the buffer memory 109. The interface control section 111 controls the interface between the buffer memory 109 and a disk apparatus 112.

Figure 2:
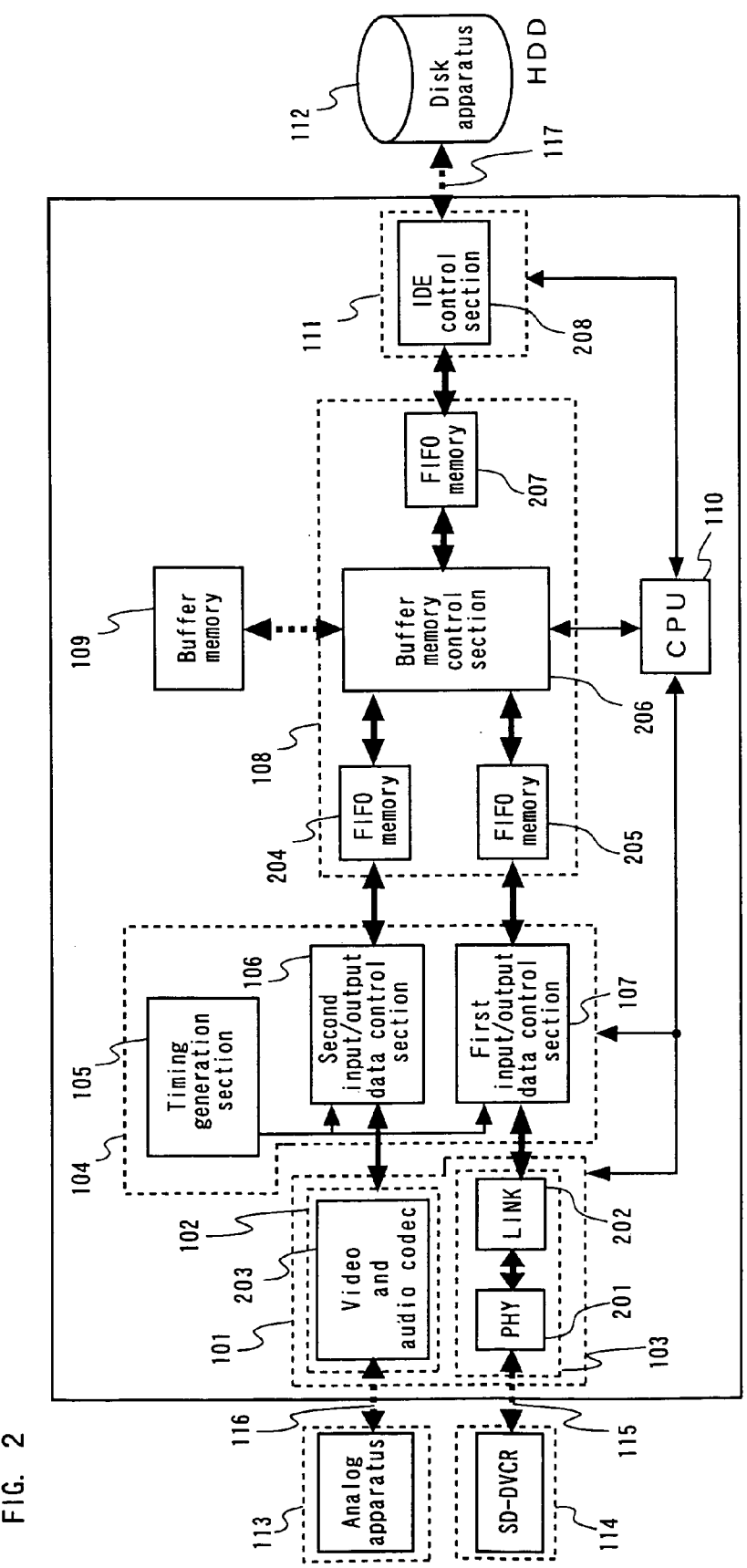
FIG. 2 is a block diagram showing a concrete configuration of the video and audio data converter of the first embodiment according to the present invention.

FIG. 2 is a block diagram concretely showing the configuration shown in FIG. 1. Using FIG. 2, the video and audio data converter of the first embodiment will be more concretely described. As shown in FIG. 2, as the first external apparatus 114, a standard definition digital video cassette recorder (hereinafter, abbreviated as SD-DVCR) having an input and output interface conforming to the IEEE 1394 (IEEE Std 1394-1995, IEEE standard for a high performance serial bus; hereinafter, abbreviated as IEEE 1394) standard is used. Moreover, as the second external apparatus 113, an analog apparatus inputting and outputting NTSC/PAL composite signals and audio signals is used.

As shown in FIG. 2, in the video and audio input/output section 101, as the first video and audio input/output section 103, an IEEE 1394 digital input and output interface constituted by a PHY section 201 performing IEEE 1394 physical layer processing and a LINK section 202 performing link layer processing is used. Moreover, as the second video and audio input/output section 102, a video and audio codec section 203 converting video and audio data of analog signals into video and audio data of the SD-DVCR is used.

In the video and audio data conversion section 104, part of the video and audio data input and output to the PHY section 201 and the LINK section 202 constituting the first video and audio input/output section 103 is replaced with the data input and output to the video and audio codec section 203 constituting the second video and audio input/output section 102.

The buffer control section 108 controls access, to the buffer memory 109, from the data input and output to the video and audio data conversion section 104, the data input and output to the CPU 110 and the data input and output to an IDE control section which is an example of the interface control section 111. The IDE control section 208 performs data control between the buffer memory 109 and the disk apparatus 112 (hard disk drive: HDD) in accordance with the command setting from the CPU 110.

Next, the blocks of the video and audio data converter of the first embodiment will be described in more detail.

[Video and Audio Input/output Section 101]

Hereinafter, the video and audio input/output section 101 in the video and audio data converter of the first embodiment will be described.

The video and audio input/output section 101 performs data conversion processing in order that digital video and audio data or an analog video and audio signal input and output to or from a plurality of external apparatuses is input and output to the video and audio data conversion section 104.

The video and audio input/output section 101 shown in FIG. 2 is configured so as to be capable of handing two-channel video and audio data.

The video and audio data of the SD-DVCR is input and output to the PHY section 201 and the LINK section 202 constituting the first video and audio input/output section 103 shown in FIG. 1. Transmission and reception among the SD-DVCR, the PHY section 201 and the LINK section 202 is performed according to the IEEE 1394, and data is transmitted by a transfer procedure standardized by the IEC 61883 (International Electrotechnical Commission: IEC 61883 consumer audio/video equipment-digital interface).

The video and audio codec section 203 constituting the second video and audio input/output section 102 converts the NTSC/PAL composite signals and audio signals input from the analog apparatus into SD-DVCR video and audio data conforming to the above-mentioned IEC 61883 standard and conversely, converts the video and audio data of the SD-DVCR transmitted to the digital interface into NTSC/PAL composite signals and audio signals, and outputs the converted data or signals.

[Video and Audio Data Conversion Section 104]

Next, the video and audio data conversion section 104 in the video and audio data converter of the first embodiment will be described.

The video and audio data conversion section 104 performs processing to replace the data input and output to the first video and audio input/output section 103 with the data input and output to the second video and audio input/output section 102, and input and output the data.

The video and audio data conversion section 104 shown in FIG. 2 is configured so as to be capable of handing two-channel video and audio data. The video and audio data conversion section 104 is constituted by a first input/output data control section 107, a second input/output data control section 106 and a timing generation section 105.

The first input/output data control section 107 controls the SD-DVCR video and audio data input and output to the PHY section 201 and the LINK section 202 constituting the first video and audio input/output section 103. The second input/output data control section 106 controls the video and audio data of the SD-DVCR input and output to the video and audio codec section 203 constituting the second video and audio input/output section 102. The timing generation section 105 generates timing signals of data such as video data, audio data and control information data in the video and audio data of the SD-DVCR.

Figure 3:
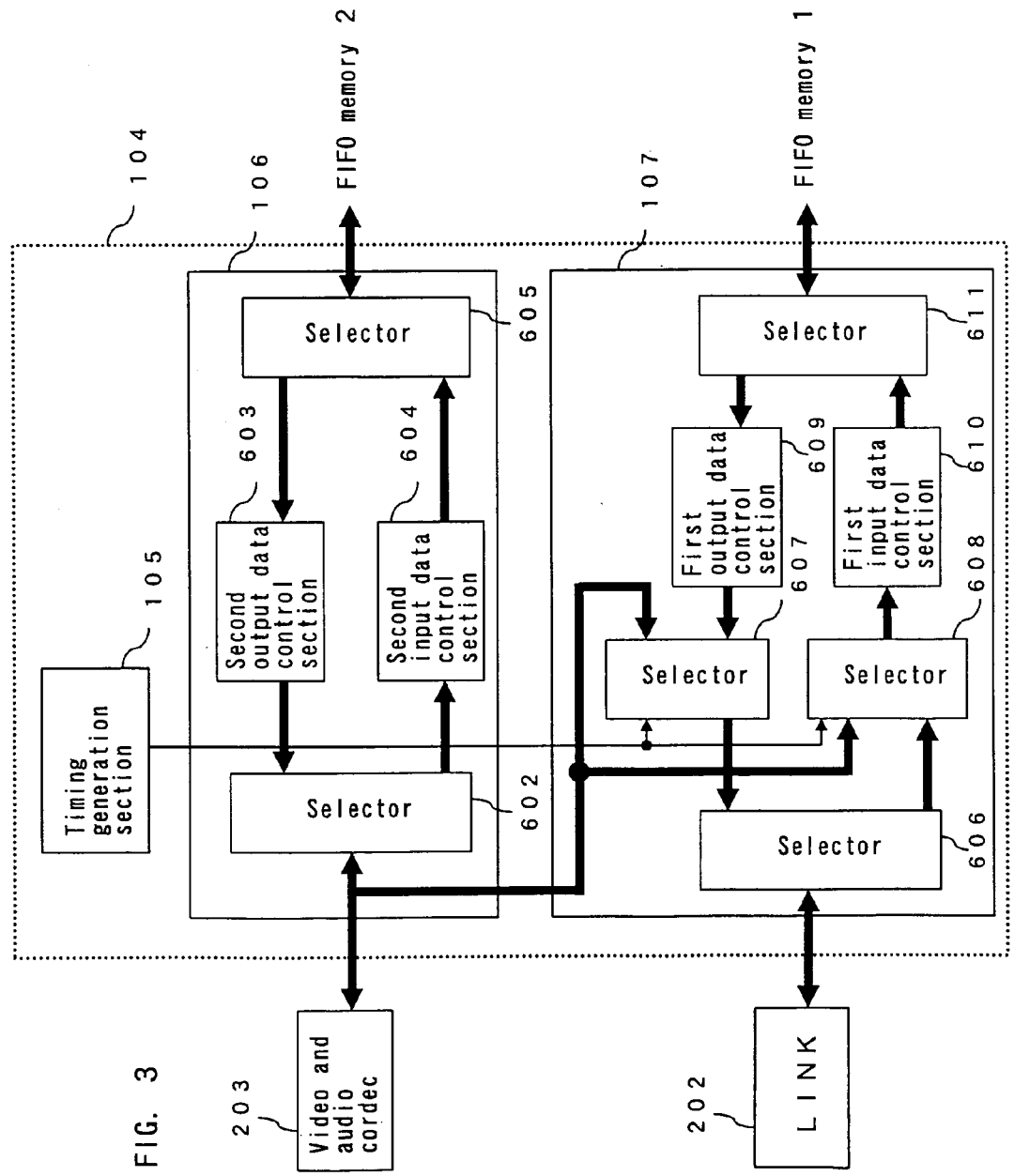
FIG. 3 is a block diagram showing the configuration of a video and audio data conversion section 104 in the video and audio data converter of the first embodiment according to the present invention.

FIG. 3 is a block diagram showing in more detail the first input/output data control section 107 and the second input/output data control section 106 constituting the video and audio data conversion section 104.

As shown in FIG. 3, the first input/output data control section 107 has a first input data control section 610 controlling data written into the buffer memory 109 and a first output data control section 609 controlling the output timing for outputting the data read from the buffer memory 109 to the first video and audio input/output section 103. The first input/output data control section 107 has two selectors 606 and 611 for switching input/output data and two selectors 607 and 608 for switching the input/output data of the second input/output data control section 106 to the input/output data of the first input/output data control section 107.

The second input/output data control section 106 has a second input data control section 604 controlling data written into the buffer memory 109 and a second output data control section 603 controlling the output timing for outputting the data read from the buffer memory 109 to the second video and audio input/output section 102. Moreover, the second input/output data control section 106 has two selectors 602 and 605 for switching input/output data.

As shown in FIG. 3, in the second input/output data control section 106, the data bus between the selector 602 and the video and audio codec 203 is connected to the inputs of the selector 607 and the selector 608 of the first input/output data control section 107 in order to switch to or from the data from the LINK section 202.

In the data switching, input data switching at the selector 607 and the selector 608 enables replacement of part of the video and audio data input and output to the first input/output data control section 107 with data of the video and audio data input and output to the second input/output data control section 106.

Figure 4:
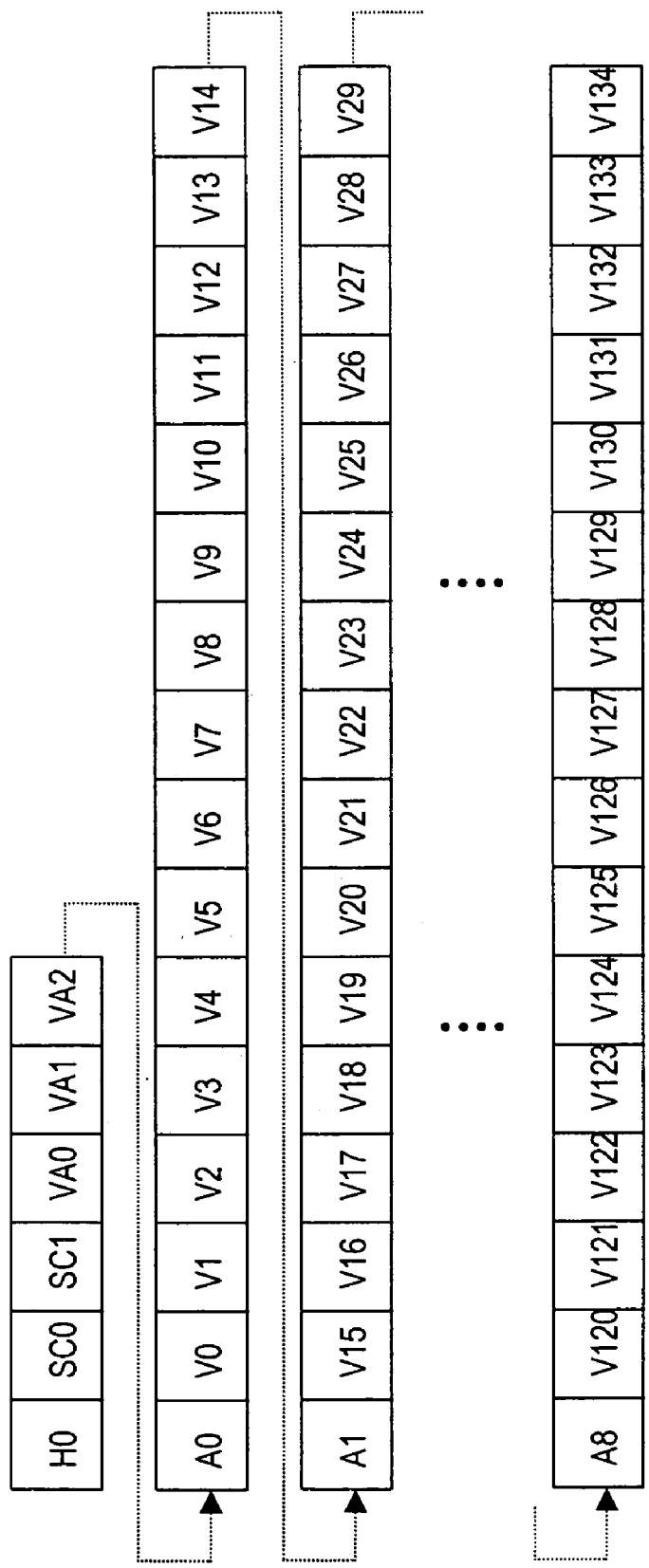
FIG. 4 is a view showing the format configuration of video and audio data in the first embodiment according to the present invention.

FIG. 4 is a view showing the data configuration of one DIF sequence which is a data unit of the video and audio data of the SD-DVCR transmitted to the digital interface. One frame of video and audio data is constituted by ten DIF sequences according to the NTSC standard and is constituted by twelve DIF sequences according to the PAL standard. In FIG. 4, H0 represents header information, SC0 and SC1 represent subcode information, VA0 to VA2 represent video control information, A0 to A8 represent audio control information and audio data, and V0 to V134 represent video data.

Figure 5:
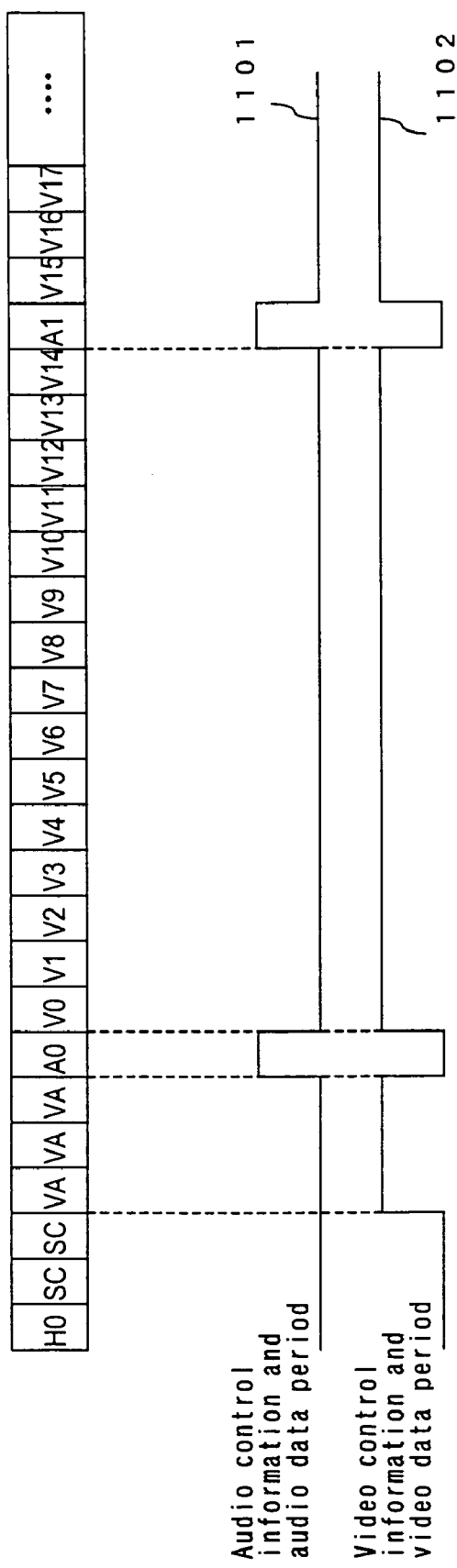
FIG. 5 is a timing chart of a timing signal of a timing generation section 105 in the first embodiment according to the present invention.

The timing generation section 105 (FIG. 3) shown in the first embodiment generates the timing of an audio control information and audio data period and a video control information and video data period in compliance with the DIF sequence. FIG. 5 is a view showing an example of the timing of the audio control information and audio data period and the video control information and video data period output by the timing generation section 105. In FIG. 5, the audio control information and audio data period is the wavelength indicated by reference numeral 1101, and the video control information and video data period is the wavelength indicated by reference numeral 1102. The timing generation section 105 generates a timing signal corresponding to audio, video or the like by counting the amount of the transferred data from the instant when the transfer is started in accordance with the setting from the CPU 110. By using the timing signal as the timing of switching at the selector 607 and the selector 608, replacement between the audio control information and audio data and the video control information and video data can be performed.

In FIG. 5, H0 represents header information, SC represents subcode information, VA represents video control information, A0 to A8 represent audio control information and audio data, and V0 to V134 represent video data.

Figure 6:
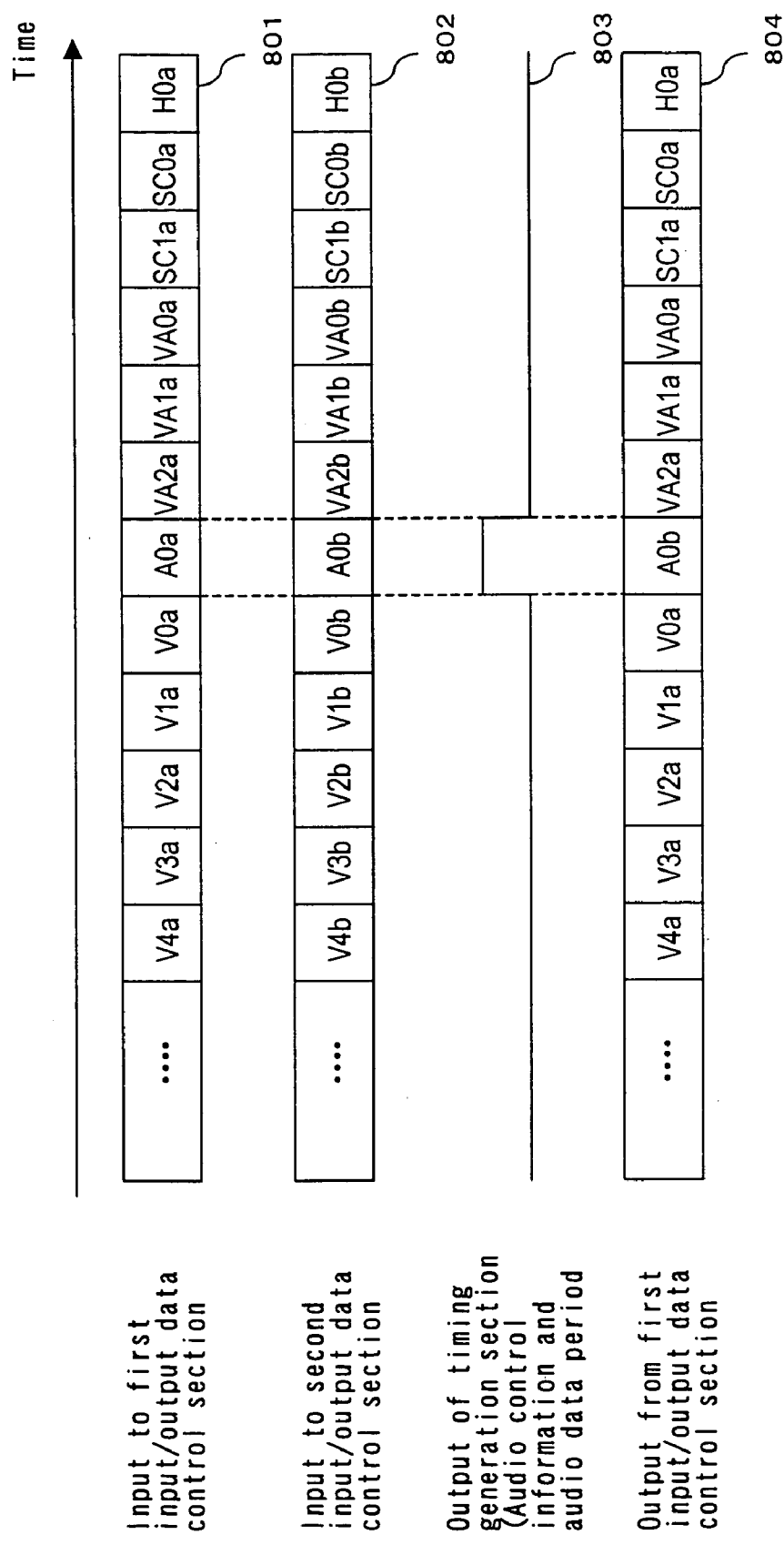
FIG. 6 is an explanatory view for explaining audio data replacement processing in the video and audio data converter of the first embodiment according to the present invention.

FIG. 6 is an explanatory view for explaining the data flow when the audio data of the video and audio data input and output to the first input/output data control section 107 is replaced with the audio data input and output to the second input/output data control section 106 in the video and audio data conversion section 104. The data shown in FIG. 6 is data when data input and output is performed in the following manner in the configuration shown in FIG. 2.

In FIG. 2, the audio signals from the analog apparatus which is the second external apparatus 113 are input to the second input/output data control section 106 through the video and audio codec section 203, and thereafter, is temporarily stored in the buffer memory 109 and is then written onto the disk apparatus 112.

At the same time, the video and audio data stored in the disk apparatus 112 is read out, and the data is temporarily stored in the buffer memory 109. The read out data is output to the first input/output data control section 107 after part of the data such as control information data is accessed by the CPU 110 and rewritten on the buffer memory 109 as required.

For the data input to the first input/output data control section 107 (the data indicated by reference numeral 801 in FIG. 6), only the audio data of the data input to the second input/output data control section 106 (the data indicated by reference numeral 802 in FIG. 6)is replaced by switching the selector 607 (FIG. 3) of the first input/output data control section 107. This replacement is performed in accordance with the timing signal of the audio control information and audio data period generated by the timing generation section 105 (the waveform indicated by reference numeral 803 in FIG. 6). Consequently, from the first video and audio input/output section 103, the data indicated by reference numeral 804 in FIG. 6 is output to the SD-DVCR which is the first external apparatus 114. That is, the video and audio data converter of the first embodiment is capable of performing audio insert edit processing in which audio signals are input from one channel while video and audio data is output from the other channel at the same time, and in doing this, the audio data of the video and audio data is replaced with only the necessary audio data and the data is output.

Moreover, in some video and audio data of the SD-DVCR, audio data is recorded in the two-channel mode. Therefore, the video and audio data converter of the first embodiment is configured so as to be capable of audio-insert-edit-processing data, corresponding to one channel, of the audio data. For example, in the audio data of each channel, in the case of NTSC, the audio data, included in the first five DIF sequences, of the data of the ten DIF sequences constituting one frame is the audio data of the first channel. Moreover, the audio data included in the latter five DIF sequences is the audio data of the second channel. Therefore, by controlling the timing signal output from the timing generation section 105 only during these periods, the audio insert edit processing can be performed for each channel.

The video and audio data converter of the first embodiment is configured so that the data input to the second input/output data control section 106 is input not only from the video and audio codec section 203 but also from the buffer memory 109 so that the data can be output to the video and audio codec section 203. Because of being configured as described above, the video and audio data converter of the first embodiment is capable of performing the insert edit processing on the video and audio data of the first input/output data control section 107.

Thus, the video and audio data converter of the first embodiment is configured so that the input and output direction of the video and audio data processed at the first input/output data control section 107 and the second input/output data control section 106 can be changed as required, and the insert edit processing can be performed in any input and output direction of the video and audio data.

Figure 7:
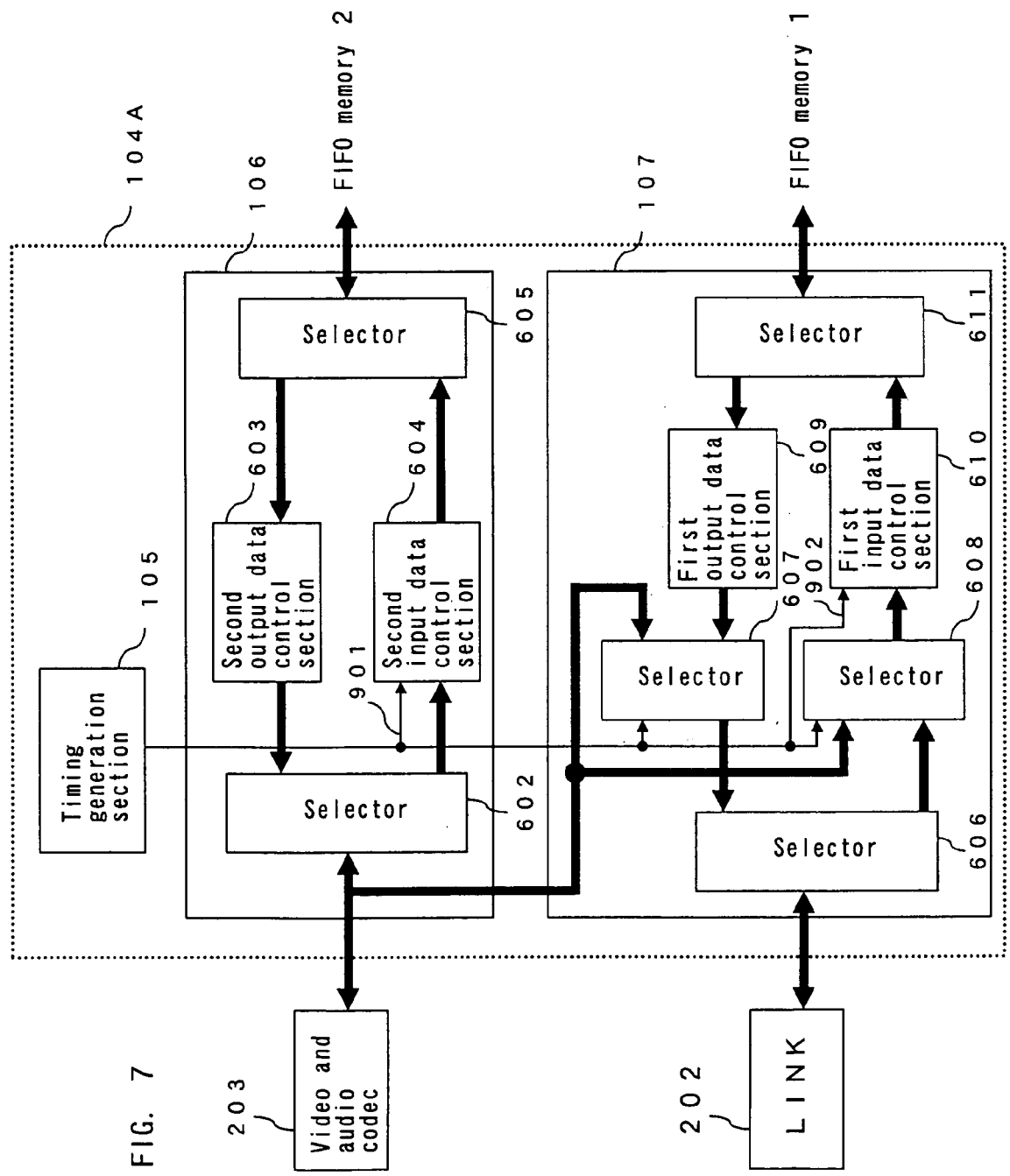
FIG. 7 is a block diagram showing the configuration of a video and audio data conversion section 104A in the video and audio data converter of the first embodiment according to the present invention.

FIG. 7 is a block diagram showing a modification of the video and audio data conversion section 104 of the first embodiment. A video and audio data conversion section 104A of FIG. 7 is different from the video and audio data conversion section 104 shown in FIG. 3 in that the timing signal from the timing generation section 105 is input to the first input data control section 610 of the first input/output data control section 107 and to the second input data control section 604 of the second input/output data control section 106, and the configuration of the rest is the same. By configuring as described above, the video and audio data conversion section 104A can limit the data output to the selector 605 and the selector 611. The video and audio data converter 104A shown in FIG. 7 enables transmission of only the audio control information and audio data into the buffer memory 109 and transmission of only the video control information and video data into the buffer memory 109.

[Buffer Control Section 108]

Next, the buffer control section 108 (see FIG. 2) in the video and audio data converter of the first embodiment will be described.

The buffer control section 108 controls access of the first input/output data control section 107, the second input/output data control section 106, the interface control section 111 and the CPU 110 to the buffer memory 109. Moreover, the buffer control section 108 performs replacement between the video and audio data input and output to the first input/output data control section 107 and the video and audio data input and output to the second input/output data control section 106 on the buffer memory 109.

Figure 8:
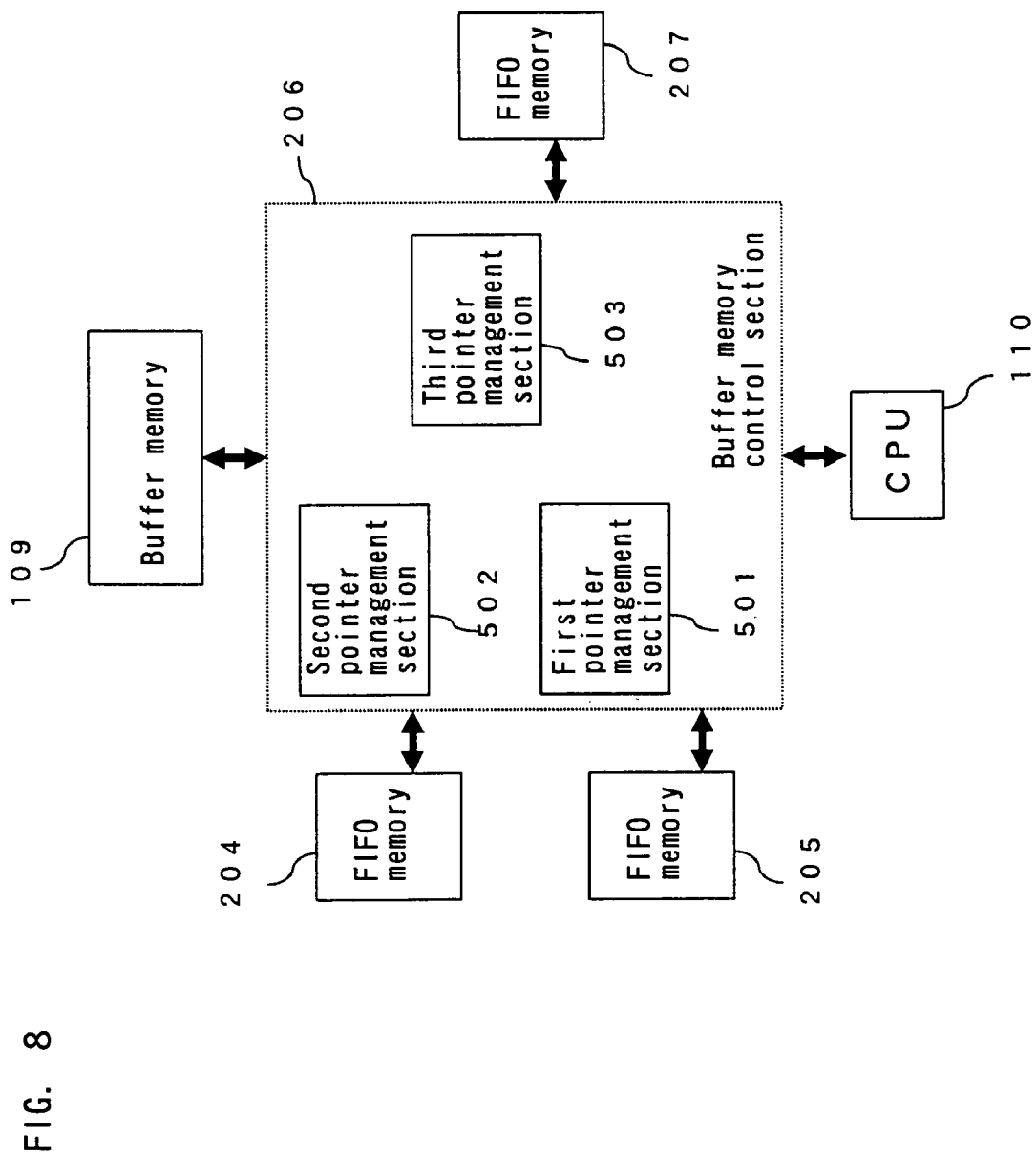
FIG. 8 is a block diagram showing the configuration of a buffer memory control section 206 in the video and audio data converter of the first embodiment according to the present invention.

As shown in FIG. 2, the buffer control section 108 is constituted by the buffer memory control section 206, the FIFO memory 204, the FIFO memory 205 and the FIFO memory 207. FIG. 8 is a block diagram showing the configuration of the buffer memory control section 206. As shown in FIG. 8, the buffer memory control section 206 is constituted by a first pointer management section 501 storing the position of access, to the buffer memory 109, of the data input and output to the first input/output data control section 107, a second pointer management section 502 storing the position of access, to the buffer memory 109, of the data input and output to the second input/output data control section 106, and a third pointer management section 503 storing the position of access, to the buffer memory 109, of the data input and output to the interface control section 111. Moreover, the buffer memory control section 206 performs arbitration control of access of the first input/output data control section 107, the second input/output data control section 106, the interface control section 111 and the CPU 110 to the buffer memory 109, and distributes the right of access to the buffer memory 109 by time sharing.

The buffer control section 108 of the first embodiment has the FIFO memory 204, the FIFO memory 205 and the FIFO memory 207 for an access wait in order that data transfer is not interrupted by a wait of access to the buffer memory 109.

Figure 9:
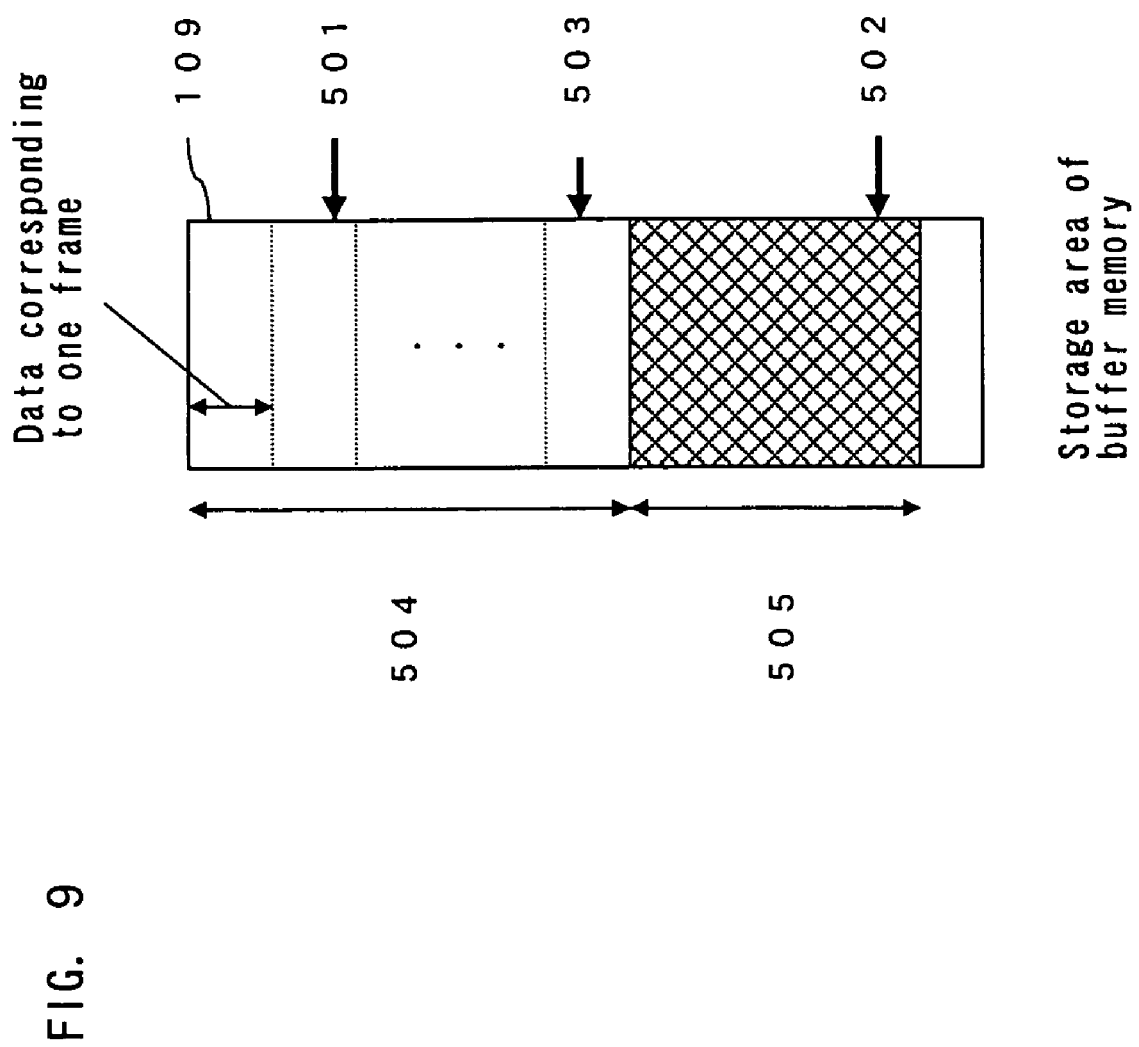
FIG. 9 is an explanatory view showing the storage area configuration of a buffer memory in the video and audio converter of the first embodiment according to the present invention.

FIG. 9 is an explanatory view for explaining the storage area of the buffer memory 109 managed by the buffer memory control section 108. In FIG. 9, the storage area of the buffer memory 109 is constituted by a first input/output data control section area 504 in which the video and audio data input and output from the first input/output data control section 107 (see FIG. 2) is stored and a second input/output data control section region 505 in which the data input and output from the second input/output data control section 106 (see FIG. 2) is stored. In these areas, the address values of the positions of access of the first input/output data control section 107, the second input/output data control section 106 and the interface control section 111 are stored by the first pointer management section 501, the second pointer management section 502 and the third pointer management section 503.

Since the buffer memory control section 206 of the first embodiment has a plurality of pointer management sections as described above, the positions of access to two video and audio data can be independently managed in units of the FIFO memories on the buffer memory 109. The CPU 110 of the first embodiment is capable of accessing the two areas of the first input/output data control section area 504 and the second input/output data control section area 505. The audio control information and audio data or the video control information and video data can be rewritten as required. For example, when the insert edit processing is performed in the video and audio data converter of the first embodiment, two or more different video and audio data on the buffer memory 109 are read out by the CPU 110, the audio data in one area is read out and the read out audio data is written into the audio data area in the video and audio data in the other area, whereby the audio insert edit processing can be realized.

[Interface Control Section 111]

Next, the interface control section 111 (see FIG. 2) in the video and audio data converter of the first embodiment will be described.

The interface control section 111 performs data control between the buffer memory 109 and the disk apparatus 112. In the first embodiment, a HDD (hard disk drive) connected to an IDE (integrated drive electronics) interface is used as an example of the disk apparatus. In the video and audio data converter of the first embodiment, the IDE control section 208 performs recording and reproduction of data onto and from the HDD.

The IDE control section 208 performs transmission to the disk apparatus 112 based on the contents of setting from the CPU 110 such as an access command, a sector size and an address. Thereby, data transmission is performed between the HDD and the FIFO memory 207.

While the interface control section 111 is realized by the IDE control section 208 in the first embodiment, the same effects are produced when a SCSI control section is formed and a SCSI HDD is used.

Second Embodiment

Next, a video and audio data converter of a second embodiment according to the present invention will be described with reference to FIG. 10.

Figure 10:
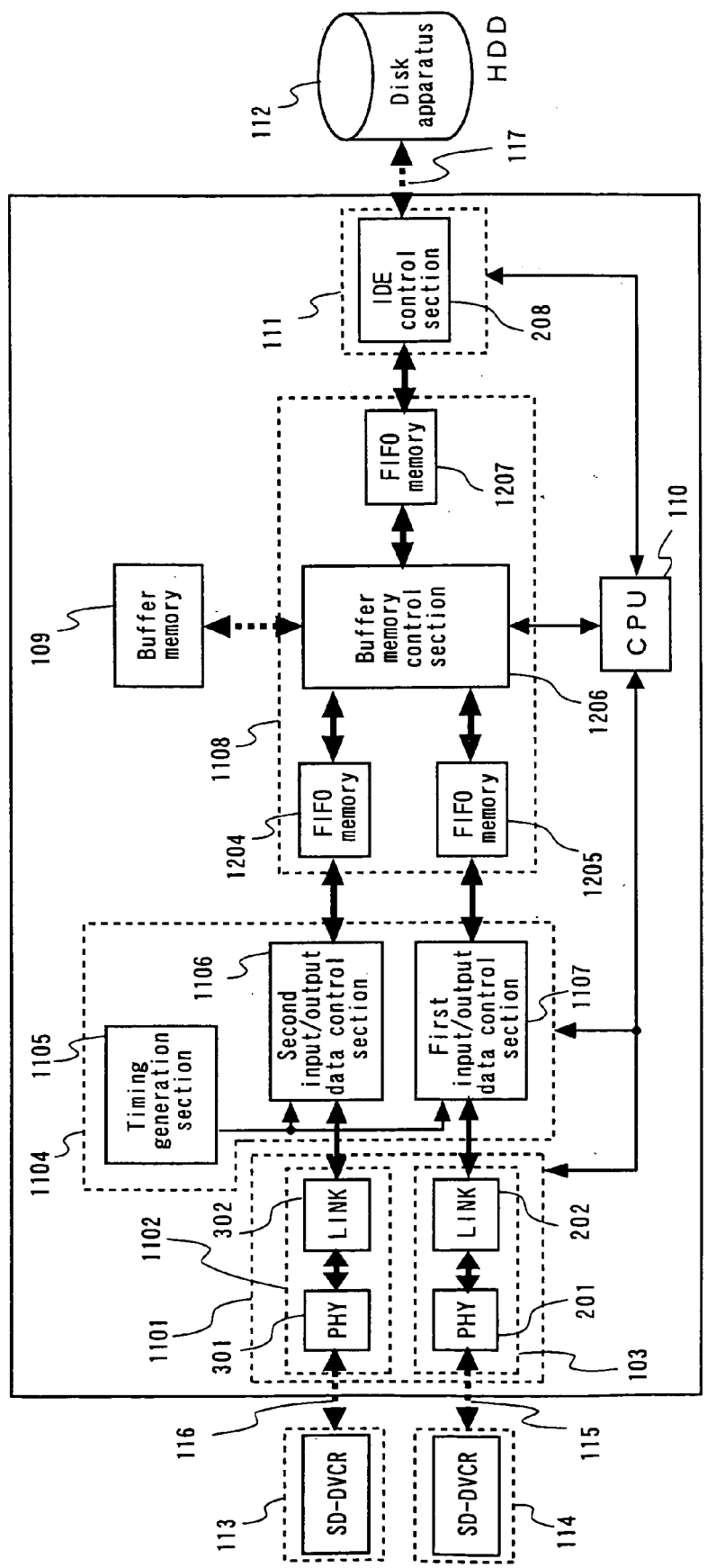
FIG. 10 is a block diagram showing the configuration of a video and audio data converter of a second embodiment according to the present invention.

FIG. 10 is a block diagram showing the configuration of the video and audio data converter of the second embodiment. In the second embodiment, the first external apparatus 114 and the second external apparatus 113 are digital video cassette recorders having an input and output interface conforming to the IEEE 1394 standard (hereinafter, abbreviated as SD-DVCRs). In the second embodiment, elements having the same functions and configurations as those of the first embodiment are designated by the same reference numerals, and descriptions thereof are omitted.

A video and audio input/output section 1101 of the second embodiment includes, as the first video and audio input/output section 103, an IEEE 1394 digital input and output interface having the PHY section 201 performing IEEE 1394 physical layer processing and the LINK section 202 performing link layer processing. Moreover, the video and audio input/output section 1101 includes, as the second video and audio input/output section 102, an IEEE 1394 digital input and output interface having a PHY section 301 performing IEEE 1394 physical layer processing and a LINK section 302 performing link layer processing.

In a video and audio data conversion section 1104 of the second embodiment, part of the video and audio data input and output to the PHY section 201 and the LINK section 202 constituting the first video and audio input/output section 103 is replaced with the video and audio data input and output to the PHY section 301 and the LINK section 302 constituting the second video and audio input/output section 1102.

The buffer control section 108 of the second embodiment controls access, to the buffer memory 109, from the data input and output to the video and audio data conversion section 1104, the data input and output to the CPU 110 and the data input and output to the IDE control section 208 which is an example of the interface control section 111.

In the IDE control section 208, data control between the buffer memory 109 and the disk apparatus 112 (hard disk drive) is performed in accordance with the command setting from the CPU 110.

In the video and audio data converter of the second embodiment, the data input and output to the second input/output data control section 106 of the video and audio data conversion section 1104 is the video and audio data of the SD-DVCRs transmitted to the digital interface standardized by the IEC 61883 which data is transmitted and received according to the IEEE 1394. Therefore, the processing performed by the video and audio data conversion section 1104 of the second embodiment is the same as the processing performed by the video and audio data conversion section 104 of the first embodiment. The buffer control section 108 and the interface control section 111 of the second embodiment will not be described because they perform similar processings to those of the first embodiment. As described above, in the video and audio data converter of the second embodiment, since the first external apparatus 114 and the second external apparatus 113 are SD-DVCRs which are digital apparatuses, the second video and audio input/output section 1102 is constituted by the PHY section 301 and the LINK section 302. As described above, in the video and audio data converter of the second embodiment, similar functions as those of the first embodiment can be realized even when the input and output signals from the two external apparatuses are two digital signals.

Third Embodiment

Next, a video and audio data converter of a third embodiment according to the present invention will be described with reference to FIGS. 11 and 12.

Figure 11:
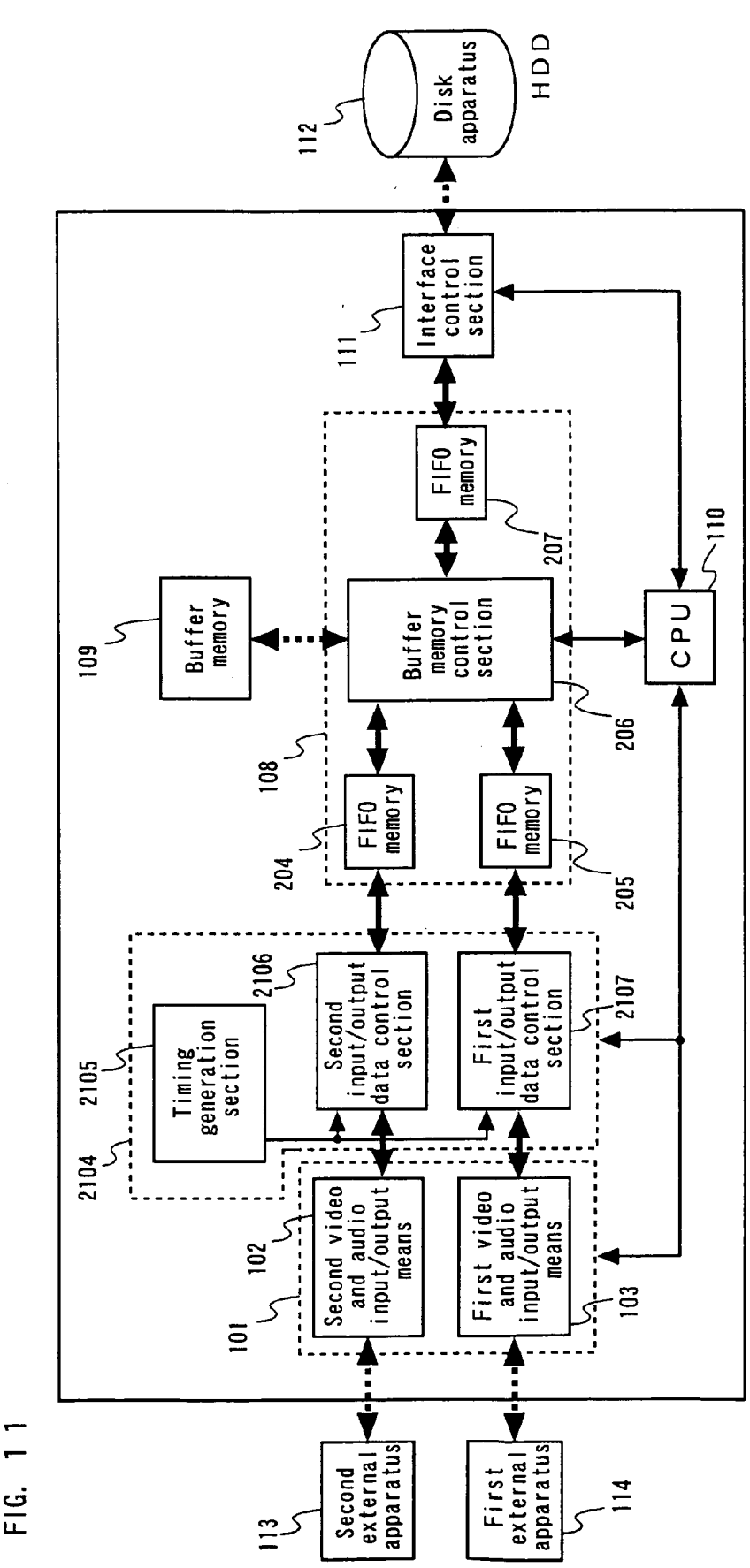
FIG. 11 is a block diagram showing the configuration of a video and audio data converter of a third embodiment according to the present invention.

FIG. 11 is a block diagram showing the configuration of the video and audio data converter of the third embodiment. The video and audio data converter of the third embodiment is different from the video and audio data converter of the first embodiment in that in a video and audio data conversion section 2104, data cannot be transmitted from a second input/output data control section 2106 to a first input/output data control section 2107. The video and audio data converter of the third embodiment is configured so that the insert edit processing of video and audio data is performed on the buffer memory 109.

Figure 12:
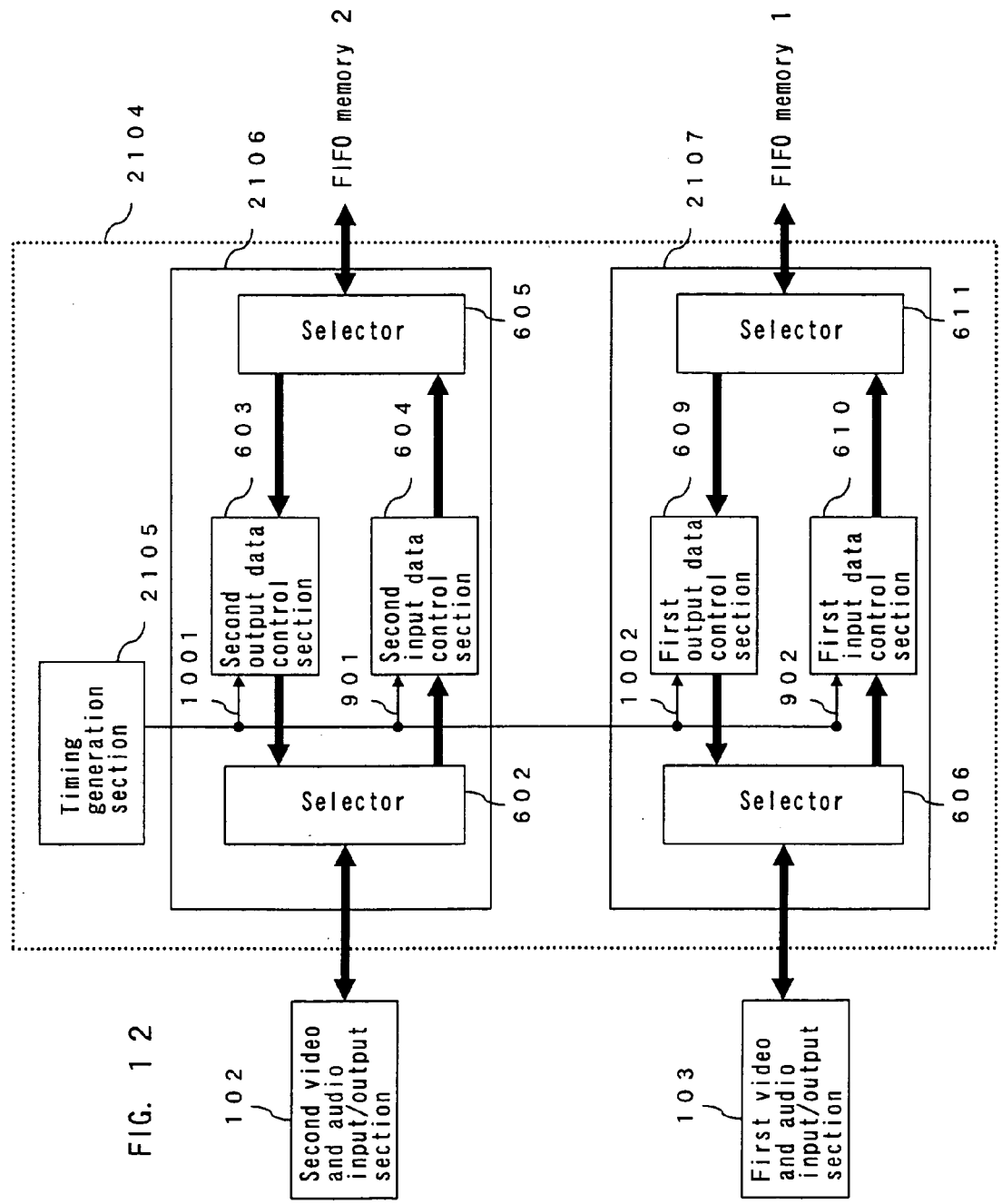
FIG. 12 is a block diagram showing the configuration of a video and audio data conversion section 2104 in the video and audio data converter of the third embodiment according to the present invention.

FIG. 12 is a block diagram showing in detail the video and audio data conversion section 2104 of the third embodiment shown in FIG. 11. As shown in FIG. 12, the signal from a timing generation section 2105 is input to the first input data control section 610, the first output data control section 609, the second input data control section 604 and the second output data control section 603. Consequently, the outputs from the first input data control section 610, the first output data control section 609, the second input data control section 604 and the second output data control section 603 can be limited by the output signals from the timing generation section 2105.

Since the video and audio data converter of the third embodiment is configured as described above, it is possible to transmit only the audio control information and audio data to the buffer memory 109 or to output only the audio control information and audio data to an external apparatus, or it is possible to transmit only the video control information and video data to the buffer memory 109 or to output only the video control information and video data to an external apparatus.

Fourth Embodiment

Next, a fourth embodiment which is a preferred embodiment of a disk apparatus according to the present invention will be described with reference to FIG. 13.

Figure 13:
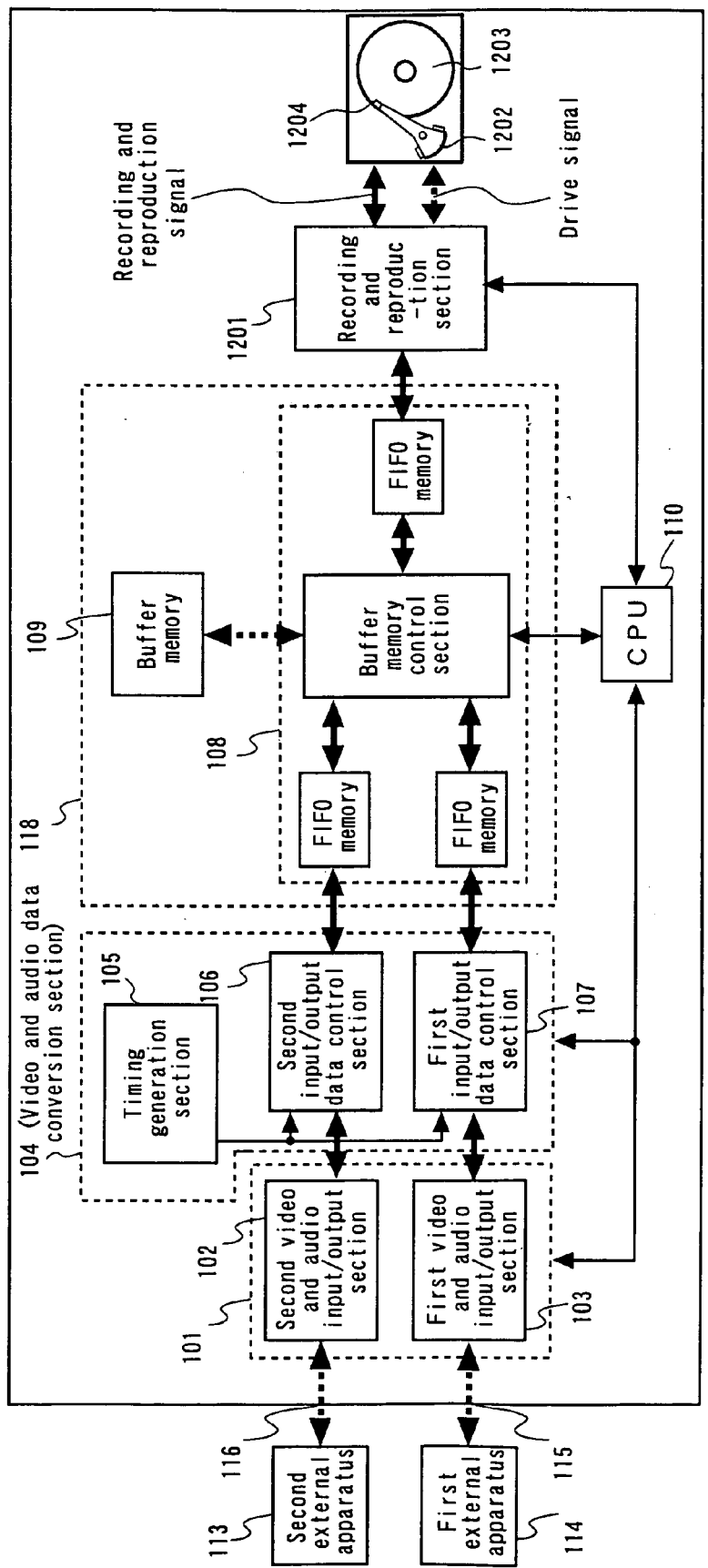
FIG. 13 is a block diagram showing the configuration of a disk apparatus of a fourth embodiment according to the present invention.

FIG. 13 is a block diagram showing the configuration of the disk apparatus of the fourth embodiment. The disk apparatus of the fourth embodiment has a configuration in which the video and audio data conversion function realized by the video and audio data converter shown in the first embodiment is incorporated in a disk apparatus. Therefore, the elements of the disk apparatus of the fourth embodiment that realize the video and audio data conversion function are basically the same as the configuration of the first embodiment. The disk apparatus of the fourth embodiment is different from the video and audio data converter of the first embodiment in that instead of the interface control section 111 (FIG. 1) shown in the first embodiment, the following are used: a disk medium 1203 enabling data recording and reproduction; a head 1204 for writing onto the disk medium 1203; an actuator 1202 for aligning the head 1204; and a recording and reproduction section 1201 for controlling these elements.

The recording and reproduction section 1201 calculates the operation amount of the actuator 1202 from the setting from the CPU 110 and a signal representative of the position of the head which signal is read from the head 1204 and causes the actuator 1202 to operate, and records and reproduces the data input and output to the buffer memory 109 onto and from the disk apparatus 1203.

Since the disk apparatus of the fourth embodiment is configured as described above, the insert edit processing of the video and audio data shown in the description of the first embodiment can be realized by the disk apparatus.

While the above-described embodiments were described by using as examples two-channel-ready apparatuses configured so that video and audio data is input from two external apparatuses, the video and audio data converter and the disk apparatus of the present invention are not limited to ones having the two-channel insert edit processing function but may be configured so as to have three-or-more-channel insert edit processing function.

As is apparent from the detailed description of the embodiments, the present invention produces the following effects:

The present invention provides a video and audio data converter having the insert edit processing function which conventional disk apparatuses do not have, and a disk apparatus using the video and audio data converter.

According to the present invention, a video and audio data converter converting video and audio data from a video and audio apparatus which is an external apparatus so as to be supported by the interface of the disk apparatus, having an input and output interface for video and audio data from a plurality of external apparatuses, and being capable of insert-edit-processing video data, audio data and video and audio data as required and inputting and outputting the processed data, and a disk apparatus using the video and audio data converter can be obtained.

Moreover, according to the present invention, a video and audio data converter capable of insert-edit-processing another video data and audio data in real time while reproducing produced video and audio data, and a disk apparatus using the video and audio data converter can be provided.

INDUSTRIAL APPLICABILITY

As described above, the video and audio data converter and the disk apparatus using the video and audio data converter according to the present invention are used as devices for recording and reproducing video and audio data which is moving image data onto and from a recording medium such as a magnetic disk and an optical disk, and are devices capable of easily editing video and audio data by converting video and audio data so as to be supported by the interface of the disk apparatus, and inputting and outputting the data to the disk apparatus in order to record the video and audio data produced by an external apparatus onto a recording medium.

What is claimed is:

1. A video and audio data converter comprising:
  a first video and audio input/output section inputting and outputting first video and audio data;
  a second video and audio input/output section inputting and outputting second video and audio data;
  a video and audio data conversion section having a first input/output data control section, a second input/output data control section, and a timing generation section;
  a data storage section temporarily storing data input and output to said video and audio data conversion section; and
  an interface control section controlling an interface in order to input/output data between said data storage section and external storage means,
  wherein said first input/output data control section comprises:
    a first input data control section controlling input data to said data storage section,
    a first output data control section controlling an output timing for outputting output data from said data storage section to said first video and audio input/output section,
    a first selector switching output data of said data storage section with input/output data of said second input/output data control section, and then outputting the switched data to said first video and audio input/output section,
    a second selector switching output data from said first video and audio input/output section with input/output data of said second input/output data control section, and then outputting the switched data to said data storage section, and
    a third selector selecting an output either of said first selector or of said second selector;
  said second input/output data control section comprises:
    a second input data control section controlling input data to said data storage section,
    a second output data control section, controlling an output timing for outputting output data from said data storage section to said second video and audio input/output section, and
    a forth selector switching an output in which output data from said data storage section is output to said second video and audio input/output section with an output in which input data from said second video and audio input/output section is output to said data storage section;
  said timing generation section is configured so as to generate timing signals each representing a timing of a video data period, a timing of an audio data period, and a timing of a video or audio control information period of the video and audio data; and
  said video and audio data conversion section is configured so as to directly replace data of video and audio data input to and output from said first input/output data control section with data of video and audio data input to and output from said second input/output data control section in synchronism with the timing signals generated by said timing generation section, and performing insert edit processing.

2. A video and audio data converter in accordance with claim 1, wherein said first input/output data control section controls output of data input from said first video and audio input/output section and output to said data storage section, in synchronism with the timing signals generated by said timing generation section, and
  said second input/output data control section controls output of data input from said second video and audio input/output section and output to said data storage section, in synchronism with the timing signals generated by said timing generation section.

3. A video and audio data converter in accordance with claim 1, wherein said data storage section comprises:
  buffer memory temporarily storing data input and output to said first input/output data control section and said second input/output data control section and data input and output to external storage means; and
  a buffer memory control section controlling said buffer memory;
  wherein said buffer memory control section comprises: a first pointer management section storing a position of access, to said buffer memory, of video and audio data input and output to said first input/output data control section; a second pointer management section storing a position of access, to said buffer memory, of video and audio data input and output to said second input/output data control section; and a third pointer management section storing a position of access, to said buffer memory, of video and audio data input and output to said interface control section, and
  the video and audio data input and output to said first input/output data control section and the video and audio data input and output to said second input/output data control section are stored in different areas on said buffer memory so that the data in the areas on said buffer memory can be accessed.

4. A disk apparatus comprising:
  a disk medium storing video and audio data;
  a first video and audio input/output section inputting and outputting first video and audio data;
  a second video and audio input/output section inputting and outputting second video and audio data;
  a video and audio data conversion section having a first input/output data control section, a second input/output data control section, and a timing generation section;
  a data storage section temporarily storing data input and output to said video and audio data conversion section;
  an interface control section controlling an interface in order to input/output data between said data storage section and external storage means; and
  a recording and reproduction section recording and reproducing data input and output to said data storage section onto said disk medium, wherein
  said first input/output data control section comprises:
    a first input data control section controlling input data to said data storage section,
    a first output data control section controlling output timing for outputting output data from said data storage section to said first video and audio input/output section,
    a first selector switching output data of said data storage section with input/output data of said second input/output data control section, and then outputting the switched data to said first video and audio input/output section,
    a second selector switching output data from said first video and audio input/output section with input/output data of said second input/output data control section, and then outputting the switched data to said data storage section, and a third selector for selecting an output either from said first selector or from said second selector;

said second input/output data control section comprises:
- a second input data control section controlling input data to said data storage section,
- a second output data control section controlling output timing for outputting output data from said data storage section to said second video and audio input/output section, and
- a forth selector switching the output in which output data from said data storage section is output to said second video and audio input/output section with the output in which input data from said second video and audio input/output section is output to said data storage section;

said timing generation section is configured so as to generate timing signals each representing a timing of a video data period, a timing of an audio data period, and a timing of a video or audio control information period of the video and audio data; and said video and audio data conversion section is configured so as to directly replace data of video and audio data input to and output from said first input/output data control section with data of video and audio data input to and output from said second input/output data control section in synchronism with the timing signals generated by said timing generation section, and performing insert edit processing.

5. A disk apparatus in accordance with claim 4, wherein said first input/output data control section controls output of data input from said first video and audio input/output section and output to said data storage section, in synchronism with the timing signals generated by said timing generation section, and said second input/output data control section controls output of data input from said second video and audio input/output section and output to said data storage section, in synchronism with the timing signals generated by said timing generation section.

* * * * *